(12) United States Patent
Haussmann

(10) Patent No.: US 6,398,269 B1
(45) Date of Patent: Jun. 4, 2002

(54) TUBE CONNECTION BETWEEN A COLLECTOR OF A MOTOR VEHICLE HEAT EXCHANGER AND AN EXTERIOR LINE

(75) Inventor: Roland Haussmann, Leimen (DE)

(73) Assignee: Valeo Klimatechnik GmbH & Co. KG, Hockenheim (DE)

( * ) Notice: Subject to any disclaimer, the term of this patent is extended or adjusted under 35 U.S.C. 154(b) by 0 days.

(21) Appl. No.: 09/582,494
(22) PCT Filed: Oct. 27, 1999
(86) PCT No.: PCT/IB99/01792
§ 371 (c)(1),
(2), (4) Date: Oct. 10, 2000
(87) PCT Pub. No.: WO00/25080
PCT Pub. Date: May 4, 2000

(30) Foreign Application Priority Data

Oct. 27, 1998 (DE) .......................... 198 49 574

(51) Int. Cl.⁷ ................................................ F16L 17/06
(52) U.S. Cl. .................... 285/365; 285/337; 285/374
(58) Field of Search ............................. 285/337, 365, 285/374, 230

(56) References Cited

U.S. PATENT DOCUMENTS

| 1,189,147 | A | * | 6/1916 | McCloy ................... 285/374 X |
| 2,140,939 | A | * | 12/1938 | Merrill et al. ........... 285/374 X |
| 2,477,533 | A | * | 7/1949 | Whiting ................... 285/374 X |
| 2,615,740 | A | * | 10/1952 | Nathan ...................... 285/374 |
| 3,346,275 | A | * | 10/1967 | Des Jardins .............. 285/365 X |
| 3,751,078 | A | * | 8/1973 | O'Brian et al. .......... 285/374 X |
| 4,127,290 | A | * | 11/1978 | Mutschlechner ........ 285/374 X |
| 4,538,679 | A | | 9/1985 | Hoskins et al. |
| 5,667,257 | A | | 9/1997 | Butler et al. |
| 6,019,396 | A | * | 2/2000 | Saito et al. .............. 285/337 X |
| 6,203,073 | B1 | * | 3/2001 | Sato et al. .................. 285/337 |
| 6,220,635 | B1 | * | 4/2001 | Vitel et al. .................. 285/337 |

FOREIGN PATENT DOCUMENTS

| DE | 4445091 A | 6/1995 |
| DE | 19652782 A | 6/1998 |
| DE | 19719251 A | 11/1998 |
| EP | 501855 A | 9/1992 |
| EP | 693667 A | 1/1996 |
| JP | 04359796 A | 12/1992 |

* cited by examiner

Primary Examiner—Lynne H. Browne
Assistant Examiner—David E. Bochna
(74) Attorney, Agent, or Firm—Liniak, Berenato, Longacre & White

(57) ABSTRACT

The invention relates to a tube connection between a collector (2) of a motor vehicle heat exchanger and a line (16) using a connecting sleeve (14) in which the free end (32) of the line (16) engages in a positive manner. An annular seal (28) is accommodated in the annular gap (22) between the inner surface (24) of the connecting sleeve (14) and the outer surface (26) of the line (16). An outer flange (38) is provided on the free end (40) of the connecting sleeve (14), and a buckled outer bead (36) is formed on the line (16). When the tube connection is completely assembled, said bead is tightened against the outer face (41) of the outer flange (38) by a clamping device (42). The seal (28) forms an insertion sleeve (44). A sealing element (48) is formed on the insertion sleeve in the peripheral area thereof situated close to the collector, and a sealing flange (46) projects from the peripheral area of the insertion sleeve situated away from the collector. Said sealing flange is axially clamped between the outer flange (38) and the outer bead (26) by the clamping device (42).

29 Claims, 3 Drawing Sheets

TUBE CONNECTION BETWEEN A COLLECTOR OF A MOTOR VEHICLE HEAT EXCHANGER AND AN EXTERIOR LINE

FIELD OF THE INVENTION

The invention relates to a tube connection between a collector of a motor vehicle heat exchanger and a line that feeds the inner heat exchange fluid to the collector or delivers it from the collector, having the further features according to the preamble of claim 1. Such a tube connection corresponds to the internal prior art of the Applicant Company.

BACKGROUND OF THE INVENTION

The invention further relates to a novel method, having the features of claim 14, for the production of such a tube connection.

According to said internal prior art of the Applicant Company, it is customary to use an O-ring as a seal between a connecting sleeve on the collector and the line. Such an O-ring is firstly fitted onto the free end of the line and is then pressed with the latter into the wide cross section, remote from the collector, between the line and the connecting sleeve, in the ideal case with an outer flange of the connecting sleeve abutting against an outer bead of the line as the O-ring is pressed flat to the dimension of the wide cross section remote from the collector. In unfavorable cases, however, a section of the O-ring becomes partly caught in the intermediate space between the outer flange and the outer bead. This leads to premature damage to the O-ring, which in itself causes sealing problems because the actual sealing function of the O-ring becomes impaired. If the O-ring is not fitted optimally, or even merely because of its tolerances, it is not uncommon for sticking to actually occur when the connecting sleeve and the line are being slid together, merely because of the undesirably deformed O-ring, so that the tube connection does not always reliably take up its intended final position. This function is further compromised by the fact that the O-ring is intended to be guided on the inner surface of the connecting sleeve into the wide cross section remote from the collector, but the transition from this inner surface into the outer flange often has an unfavorable curvature, owing to tolerances, and the inner surface is further often modified by lateral spreading of a flux to such an extent as to impair the friction. When the O-ring is slid onto the free end of the line, it is also possible for the O-ring to suffer undesired twisting and turning, although in the ideal case it is supported from the rear of the outer bead. Such negative effects can only be overcome to some extent if a high fitting force is applied; however, this still leaves the risk of undesired deformation of the O-ring and of deformed regions of the O-ring entering the space between the outer bead and the outer flange. The difficulties of the known method are further exacerbated by the fact that, during the final assembly of the tube connection, the connection clips, which are customarily used for the final clamping of the outer flange and the outer bead together with the O-ring in between, can only be mounted, by gripping the outer flange and the outer bead, if the outer flange and the outer bead bear tightly on one another and are not forcibly spaced apart somewhat by extraneous inserted parts such as sections of the unintentionally deformed O-ring. This leads to a recognizable unsuccessful tube connection, which is discarded as a reject. But even if the outer flange and the outer bead do achieve the desired tight connection, this tight connection still always needs to be maintained using separate means while the connection clips are being mounted. In the case of manual assembly, as is customary in repair and servicing operations, for example, both hands are hence needed for mounting the clip, without for example having one hand still available to hold the tube or another aid, such as a pair of pliers or a lamp.

SUMMARY OF THE INVENTION

The object of the invention is hence to refine a tube connection of said type in such a way that it can be assembled easily and reliably, without the risk of incorrect connections, using only one hand or only one corresponding tool function, without having the tendency to come apart again by itself after assembly, but before a clamping device such as the connection clip etc. has yet been applied.

This object is achieved by all the features of claim 1.

As is shown particularly clearly by the preferred production method according to claim 14—with the expedient refinement according to claim 15, the two features of which are preferably both implemented—the seal according to the invention is not fitted into the connecting sleeve on the free end of the tube connection, like the O-ring previously was, but in the internal cross section, here the wide cross section remote from the collector, inside the connecting sleeve on the collector. This has the advantage that, with this pre-assembly, a rough surface on the inside of the connecting sleeve or an unfavorable curvature geometry existing there no longer represents a problem for fitting the seal, since the pre-assembly is carried out still without compression. In the final state of the tube connection, a part of the seal, namely its sealing flange, is then intentionally clamped between the outer flange of the connecting sleeve and the outer bead of the line.

Since seals of the type in question here, whether they are O-ring seals or the form of the seal according to the invention, are made from relatively pressure-resistant elastomer material, the final state of the tube connection can, even while accommodating tolerances, be set up accurately by abutment of the sealing flange between the outer flange and the outer bead on their surfaces that face one another. Since, in this case, at least one sealing element, which is equivalent in its sealing action to an O-ring of normal design, is formed on the insertion sleeve of the seal, no functional disadvantage compared with the conventional sealing by an O-ring has to be tolerated in the case of the tube connection according to the invention, and moreover all said disadvantages can be avoided. This is particularly important because, in terms of their industrial production, that is to say when they are mass-produced articles, tube connections of the type in question here are arranged relatively inaccessibly in the foot space of motor vehicles.

In particular, special emphasis should further be placed on the following advantages: because the sealing element, which acts in the invention in similar fashion to the previous O-ring, is arranged on the insertion sleeve, the sealing element can no longer twist its cross section in the circumferential direction, as results in the case of the conventional O-ring with the creation of shear forces, which in turn lead to premature ageing. During the final assembly of the tube connection, which can be carried out with relatively small axial assembly forces, these assembly forces are also particularly small because, when the free end of the line is being inserted into the insertion sleeve and optionally the narrow cross section of the connecting sleeve next to the collector, the insertion sleeve can expand axially and is hence deformable in the direction of travel during the insertion movement, without experiencing a transverse extension that creates resistance as in the case of the known O-ring. What is particularly important is that, as early as during the pre-assembly, the sealing element replacing the O-ring is arranged at its definitive sealing location in the widened cross section between the connecting sleeve and the free tube end, and does not need to be pressed into this widened cross section only during the final assembly. Lastly, the tube connection according to the invention is also more reliable in terms of the risk that the incorporation of a seal might perhaps be forgotten during assembly. In the previously known case in which an O-ring seal is used, omission of the latter may nevertheless still lead to temporary purely metallic sealing between the outer flange of the connecting sleeve and the outer bead of the line, although this temporary metal seal cannot withstand continuous operation. In the case of the tube connection according to the invention, the clamping device intended for the final clamping, for example a connection clip, is set from the start onto a sandwich-like succession of the outer flang—sealing flange—outer bead, and always leaves free a leakage gap acting as a leak between the outer flange and the outer bead, if the seal according to the invention is not incorporated.

In the case of the tube connection according to the invention, there are also other advantageous possible refinements according to the dependent claims. Some particularly important examples of these refinements will be emphasized below:

It is possible, according to requirements, to arrange further sealing elements on the insertion sleeve, on the sealing flange and in the transition region between the sealing flange and the insertion sleeve (cf. especially claims 6 and 7). In this context, distinction may be made between radially acting and axially acting sealing elements, and it is also possible to use both types.

Further, in addition to local sealing, it is also possible to provide extensive sealing (cf. especially claims 10 and 11). In the case of extensive pressure, however, it is necessary to take into account the fact that the components interacting with one another in each case have their own tolerances, so that extensive compression need not always be reliably ensured, and a capillary gap may possibly be created. So that this does not lead to more or less permanent leakage by capillary action, a capillary break is preferably also provided on the seal according to the invention in the vicinity of an extensive compression or even only a relative contact (cf. claim 12).

A wedge shape at the transition of the insertion sleeve into the sealing flange and/or a return projection engaging over the outer flange on the sealing flange (cf. claims 11 and 13), besides the fact that they further promote the sealing action, are also particularly helpful in avoiding the possibility that in the assembly, under particularly unfavorable circumstances, the insertion sleeve together with the sealing flange may be pressed into the wide cross section, remote from the collector, inside the connecting sleeve.

The invention will be explained in more detail below with reference to several illustrative embodiments, with the aid of diagrammatic drawings in which:

BRIEF DESCRIPTION OF THE DRAWINGS

FIG. 3 and FIG. 3a respectively show a radial section of a second and third embodiment of the seal, compared with FIG. 2 and FIG. 2a;

DESCRIPTION OF THE PREFERRED EMBODIMENTS

Figure 1:
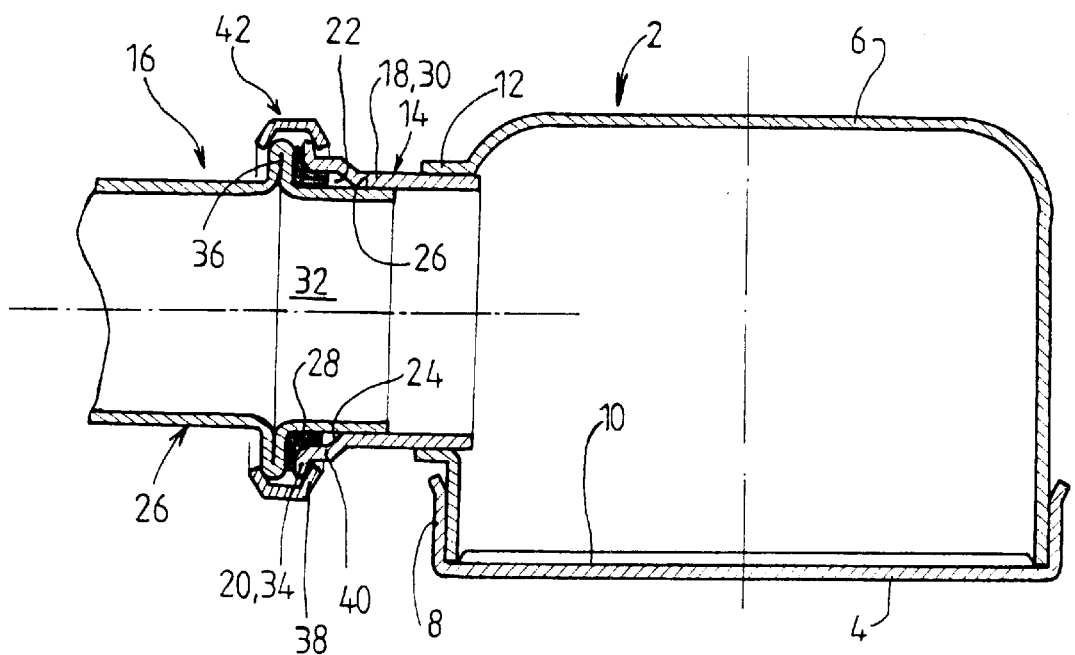
FIG. 1 shows a cross section through a tube connection between a collector of a motor vehicle heat exchanger and an exterior line for the inner heat exchange fluid of the collector with a connection clip installed.

A conventional structure of a tube connection, the sealing of which is configured according to the invention, will be described first with the aid of FIG. 1.

A collector 2 of a motor vehicle heat exchanger is formed in two parts by a tube bottom 4 of the motor vehicle heat exchanger and a cover 6. The tube bottom 4 has a flanged edge 8, in which the cover 6, designed in the shape of a pot, of the collector 2 engages and is brazed. Inwardly bent collars 10, in which ends of flat tubes (not shown) of the motor vehicle heat exchanger engage and are likewise brazed, can be seen on the tube bottom 4. This is in other respects the collector of a conventionally designed flat tube heat exchanger, which need not be described in further detail.

The collector 2 is used to feed the inner heat exchanger fluid of the motor vehicle heat exchanger to the flat tubes, or deliver it again from the collector after it has flowed through the flat tubes. The collector may in this case be an input collector, an output collector or even a collector which, by using a transverse wall (not shown), combines the functions of an input collector and an output collector, in which case the other ends of the flat tubes merely need to be connected to one another in terms of flow to form a multiple-stream arrangement.

Instead of flat tubes, heat exchanger tubes having a different cross section could be used.

The cover 6 of the collector 2 has an outwardly directed collar 12, into which a separate connecting sleeve 14 is inserted and in turn brazed. Alternatively, the connecting sleeve 14 could also be manufactured integrally with the collector 2, or with its cover 6.

The connecting sleeve 14 communicates with a line 16, which feeds the inner heat exchanger fluid to the collector 2, or delivers it from the collector 2, according to whether the latter has an input or output function.

The connecting sleeve 14 has its cross section stepped two times in the direction of the line 16, with the corresponding symmetrical increase of the internal cross section. In the vicinity of the first step 18, the free end, facing the collector 2, of the line 16 engages fully or, as graphically represented, with a part of the thickness of the tube casing. In the vicinity of the second step 20, which describes a likewise symmetrical further extension outward, a circumferential annular gap 22 is formed, with the casing of the line 16 whose cross section remains unaltered here, between the inner surface 24 of the connecting sleeve 14 and the outer surface 26 of the line 16, in order to at least partially accommodate a seal 28 extending annularly around. In the vicinity of the first step 18, the connecting sleeve 14 hence has a narrow cross section 30, next to the collector, into which the free end 32 of the line 16 positively engages, and, in the vicinity of the second step 20, has a wide cross section 34, remote from the collector, which is used in the manner described above in order to form the annular gap 22.

The line 16, which has an otherwise constant outer cross section in the region described here, is provided with an outer bead 36, obtained by a longitudinal buckling, which has a nature similar to that of an annular flange and into whose flange area that projects above the outer surface 26 of the line 16, the outwardly projecting original tube casing parts obtained by the buckling bear very tightly against one another with a double-walled configuration.

The outer bead 36 interacts, in the capacity of an end flange of the line 16, with an outer flange 38 on the free end 40 of the connecting sleeve, which is obtained by flanging of this free end outward. The outer flange 38 and the outer bead 36 have, without restriction of the generality, the same outer diameter in this case, although slight differences are still acceptable.

In the final assembly state, a connection clip 42 is used to permanently clamp together the outer flange 38, provided with the outer end surface 41, on the connecting sleeve 14 and the outer bead 36 on the line 16.

Figure 4:
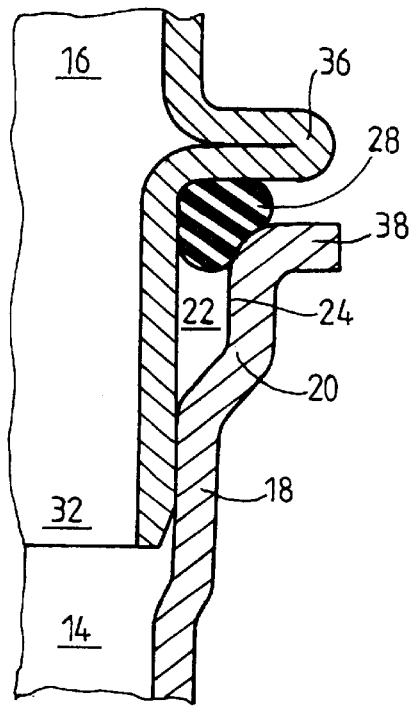
FIGS. 4, 4a and 4b show illustrations of the internal prior art with an O-ring being used, in each case also in a schematized radial section of the tube connection, FIG. 4 representing a first assembly phase of the compression of the O-ring, FIG. 4a the desired end phase of the compression and FIG. 4b a typical intermediate or end phase of a failed compression.
Figure 4A:
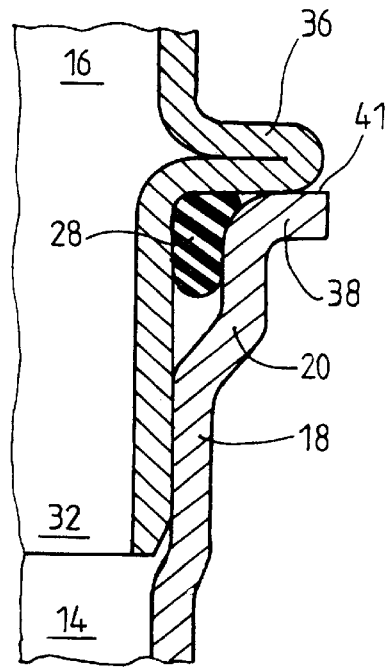
Figure 4B:
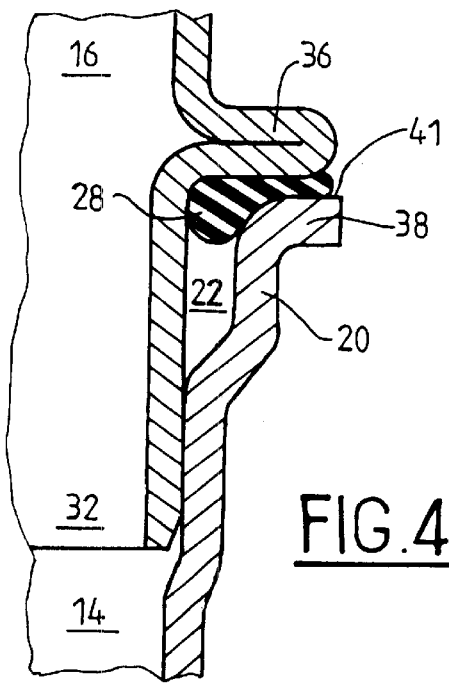

In the case of a tube connection according to FIG. 1, according to the internal prior art an O-ring, which represents the future seal of the tube connection, is firstly fitted undeformed onto the free end of the line 16, in contact with the outer bead 36. In order to obtain good radial compression in the annular gap 22 later on, the O-ring has in this case, in the undeformed state, a diameter larger than the radial width of this annular gap. Together with the O-ring, the line 16 is then slid into the connecting sleeve 14, with the free end 32 of the line, at the start of the compression of the O-ring, already engaging in the vicinity of the first step 18 of the connecting sleeve 14. Such an intermediate phase of the assembly is illustrated in FIG. 4, where the O-ring that is provided as a seal 28 on the rounded shoulder, which constitutes the transition of the inner surface 24 of the second step 20 of the connecting sleeve 14 into the outer flange 26, has already experienced a deformation, which on the one hand extends in the intended way into the annular gap 22, but on the other hand also extends somewhat into the intermediate space between the outer flange 38 and the outer bead 36, in a manner that is not actually intended. In the desired final state of the tube connection, the entire mass of the O-ring is then compressed according to FIG. 4a into the end state of the tube connection, in which the end surface 41 of the outer flange 38 comes into direct contact with the end surface of the outer bead 36 facing it, and the O-ring is entirely compressed with a radial compression in the annular gap 22 between the inner surface 24 of the connecting sleeve 14 and the outer surface of the free end 32 of the line 16. In contrast to this, a typical unsuccessful tube connection is shown in FIG. 4b, where the O-ring does not in practice extend substantially stantially further into the annular gap 22 than in the previous assembly phase according to FIG. 4, but instead has become compressed with a considerable section between the outer flange 38 and the outer bead 36, so that these parts can no longer come into direct contact with one another, clamping by means of the connection clip 42 engaging over only a limited clamping range is no longer possible and the radial sealing function is to a considerable extent lost.

Figure 2:
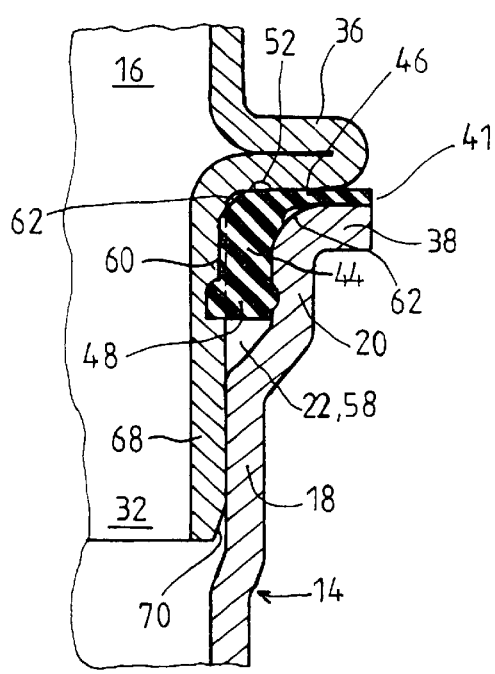
FIG. 2 shows a radial section through a first embodiment of a fictitious arrangement of the tube connection still without a clamping device, in which a first embodiment of the seal is arranged in the original, still uncompressed state with the line and the connecting sleeve of the collector superimposed, essentially between these parts.
Figure 3:
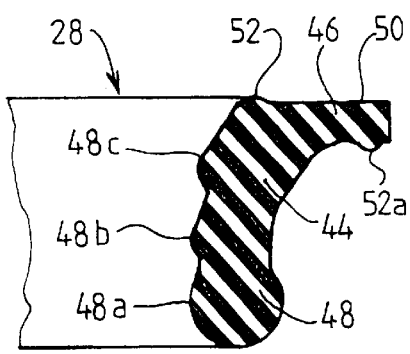
Figure 3A:
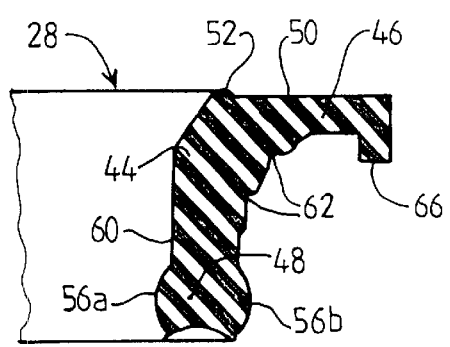

In the case of the tube connection according to the invention—and consequently also in the three illustrative embodiments of FIG. 2 with 2a, 3 and 3a, the seal 28 has an insertion sleeve 44 and a sealing flange 46 arranged on one end of the latter. In the vicinity of the other end of the insertion sleeve 44, a first sealing element 48, which is configured differently in FIGS. 2, 3 and 3a, is formed on the circumference of this sleeve. In a manner that is not shown, a plurality of two or more first sealing elements 48 may also be formed along the insertion sleeve. All such first sealing elements are intended to fulfill the function of the O-ring of the internal prior art, that is to say the function of radial sealing by radial compression in the annular gap 22 between the connecting sleeve 14 and the line 16.

In addition, the sealing flange 46 inherently fulfills yet a further axial sealing function between the outer flange 38 and the outer bead 36. In all three illustrative embodiments shown, in order to reinforce this axial sealing action, a second sealing element 52, which projects beyond the end surface 50 of the sealing flange 46 in the uncompressed state, is respectively also formed on the sealing flange 46, approximately in extension of a central cross-sectional region of the insertion sleeve 44, and a plurality of these second sealing elements may in turn also be present, in which case they are typically either radially further out on the end surface 50 and/or also on the rear side of the sealing flange 46, as is represented by the second sealing element 52a in FIG. 3. In FIG. 3, three first sealing elements 48a, 48b and 48c are also formed axially along the insertion sleeve 44, the first sealing elements 48b and 48c of which are projecting annular beads circumferentially running radially inward.

With reference to the first sealing element 48a of FIG. 3, it is shown that this may itself entirely assume the cross section of a conventional O-ring, although in this case it is not isolated but is formed integrally on the free end of the insertion sleeve 44 remote from the sealing flange 46.

However, because of the additional further sealing possibilities in the case of the seal 28 according to the invention, the radial compression and hence the radial sealing action of the first sealing element may also be attenuated compared with the compression of an isolated O-ring. FIG. 2 shows a first attenuation possibility. In this case, the cross section of an O-ring on the free end of the insertion sleeve 44 is cut off to form an obtuse radial end surface 54. In this case, a residual contour of an O-ring still extends radially inward, while, radially outward, a further reduction to a narrower circumferential annular bead is made in the axial direction. As an alternative, the nature of the configuration radially inward and radially outward could also be interchanged, of further modifications to the cross section of an O-ring could be made.

While, however, in the design forms of the first sealing element 48 which are described and which are discussed as variants, a more or less pronounced full cross section of this first sealing element is provided, FIG. 3a shows that it is even possible to provide a design form that is concave on the end according to FIG. 3a. In the case of the latter, the cross-sectional shape of FIG. 2 is modified by the concave design on the end and weakened in terms of radial application force so greatly as to create one sealing lip 56a and 56b each, radially inward and radially outward, respectively. Both sealing lips are pressed via the concave recess on the end by internal pressure onto the inner surfaces of the annular gap 22. The recess in the full cross section does not, however, extend so far that the prestress radially outward is completely lost. Instead, this prestress radially outward is still intended to remain to such an extent that, even in the case of the negative pressure conditions liable to occur during operation in the space 58 to be sealed, sufficient radial compression against the mutually facing surfaces 24 and 26 of the annular gap 22 is still guaranteed.

In all three first illustrative embodiments, the insertion sleeve 44 merges with wedge-shaped widening, corresponding to the curved transition of the connecting sleeve 14 from the second step 20 into the connecting sleeve 14, into the sealing flange 46. As can be seen from FIG. 2, the insertion sleeve 44 further has on its radial inner surface 60, starting from a rounded transition of the sealing flange 46, a for example conical gradual taper toward the free end of the insertion sleeve 44. A wedge shape is thereby obtained overall between the free end of the insertion sleeve 44 and the sealing flange 46.

The first sealing element 48 or, in the case of several first sealing elements, the first sealing element 48a nearest the collector, causes fully or approximately a radial thickness compression in relation the radial dimension of the annular gap 22 of 20 to 40%. This corresponds to the usual radial compression in the case of the conventional O-rings as well, and is still guaranteed in the lower limit range even in the case of the embodiment of FIG. 3a.

The only one-sided radial compression on the inside of the further first sealing elements 48b and 48c according to FIG. 3 is smaller by comparison, but always still significantly more than 0%. Following on from the single first sealing element 48, or the first sealing element 48c still furthest from the collector, additional extensive compression, typically in the 0 to 20% range, occurs in the wedge region of the transition of the insertion sleeve 44 into the sealing flange 46. With unfortunate coincidence of tolerances, this extensive compression may be entirely or close to 0 in this case, or may even lead to slight free gaps. In all these cases, there is the risk of a capillary creep flow along the desired extensive compression region. In order to stop leakage due to capillary action here, a circumferential capillary break 62 in the form of a circumferential groove is provided in the outer surface of the seal 28, following on axially in the direction toward the sealing flange 46, radially outward (as shown)—and optionally instead of this or additionally radially inward (not shown).

Figure 2A:
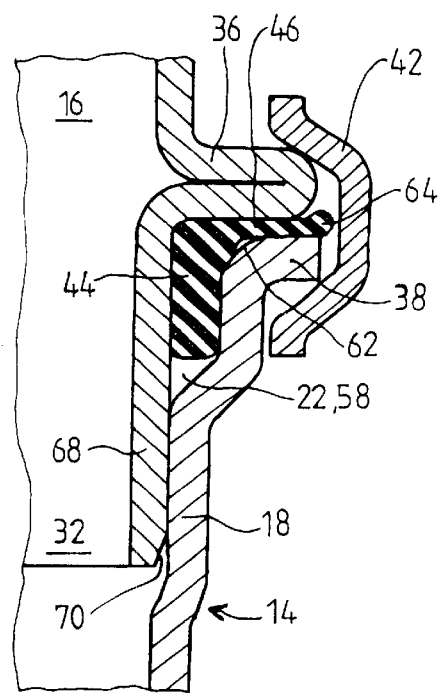
FIG. 2a shows a comparable radial section to FIG. 2, in which the same seal as in FIG. 2 is compressed in the final state of the tube connection and is held in the compressed state by means of a connection clip.

In the final connection state of the tube connection, unlike in the case of sealing by means of the conventional O-ring, direct contact of the outer flange 38 on the outer bead 36 does not occur, but instead the sealing flange 46 always remains in between according to FIG. 2a. Because of the axial compression forces into the final position of the tube connection, the sealing flange 46 swells radially outward somewhat in this case, as is illustrated by the radially outer bulge 64 in FIG. 2a.

FIG. 2 with FIG. 2a describes in this regard the case of an entirely normal annular flange design of the sealing flange 46. The same applies to the second embodiment according to FIG. 3. The sealing flange, however, is modified slightly in this case by the respective way in which at least one second sealing element is arranged. According to FIG. 3a, a return projection, which in the normal case runs radially around, but may also be divided into sections distributed in the circumferential direction, is provided on the side of the sealing flange 46 facing the collector, on this flange's radially outer end. The return projection may likewise, unlike in FIG. 3a, have a cross section that is different than rectangular. What is essential is that it can externally engage around the outer flange 38 of the connecting sleeve 14.

The typical assembly procedure in the case of the tube connection according to the invention is as follows:

The insertion sleeve 44 of the seal 28 is firstly slid as far as possible into the second step 20 on the connecting sleeve 14, expediently until the side of the sealing flange 46 facing the collector is in contact with the free end surface 41 of the outer flange 38. The line 16 is then slid into the insertion sleeve 44, expediently in turn until the outer bead 36 is in contact with the free end surface 50 of the sealing flange 46. This is possible, in comparison with the assembly procedure for a conventional O-ring, explained with reference to FIGS. 4 to 4b, with much smaller assembly forces and with substantially greater reliability in achieving a correct tube connection with strong sealing function and without inadvertent omission to include a seal 28. In the state of the final tube connection, it is then possible to fix the final assembly state using the connection clip 42 or another clamping device, without forces that pull apart again having to be taken into account in this regard, as they were in the case of the O-ring, so long as one neglects the relatively slight deformation forces of the sealing flange 46, which are illustrated with the aid of the radial bulge 64 when FIG. 2 is compared with FIG. 2a. Apart from the axial stretching also mentioned above, the position of the insertion sleeve 44 in the annular gap 22 remains virtually unchanged from then on during the assembly process, unlike in the case of the O-ring.

In general, and especially in the case of all three illustrative embodiments, the radial compression is promoted yet further by the fact that in addition, in the vicinity of the first step 18 of the connecting sleeve 14, a step 68 extending radially inward is also formed in the free end 32 of the line 16, which step typically has a ramp with a small assembly angle, typically of 10 to 20°, along which the shoulder, which constitutes the transition of the first step into the second step of the connecting sleeve 14, can run down during the radial compression of the insertion sleeve 44. In addition, the free end 32 of the line 16 is provided on the outside with a chamfer 70 serving as an introduction slope, so that introduction into the insertion sleeve 44 does not damage the latter from the inside.

What is claimed is:

1. A tube connection between a collector (2) of a motor vehicle heat exchanger and a line communicating a inner heat exchanger fluid to a collector (2), said tube connection comprising:

an outwardly projecting connecting sleeve (14)—which is made from at least one of aluminum and an aluminum alloy—on the collector (2) having a narrow cross section (30), next to the collector, into which a free end (32) of the line (16) positively engages, and a wide cross section (34), remote from the collector, which forms an annular gap (22) between an inner surface (24) of the connecting sleeve (14) and an outer surface (26) of the line (16), in order to at least partially accommodate a seal (28) extending annularly around the line (16), which, with a (first) sealing element (48; 48a, b, c), which seals both against internal positive pressure and against internal negative pressure, an outer flange (38), being provided on a free end (40) of the connecting sleeve (14), a buckled outer bead (36) disposed on the line, lying opposite an outer end surface (41) of the outer flange (38) and which, in a final assembly state, is clamped against the outer end surface (41) of the outer flange (38) by a clamping device, wherein the seal (28)

forms an insertion sleeve (44) that engages into the wide cross section (34), starting from a side remote from the collector, on the circumferential region of which, next to the collector, the (first) sealing element (48; 48a, 48b, 48c) is formed, and from the circumferential region of which, remote from the collector, a sealing flange (46), which is axially clamped between the outer flange (38) of the connecting sleeve (14) and the outer bead (36) of the line (16), by the clamping device (42), protrudes.

2. Tube connecting according to claim 1, wherein the (first) sealing element (48; 48a, 48b, 48c) is formed on the end next to the collector.

3. The tube connection according to claim 2 wherein the sealing flange (46) is formed on the end of the insertion sleeve (44) remote from the collector.

4. Tube connection according to claim 1, characterized in that the cross section of the (first) sealing element (48; 48a, 48b, 48c) is extended at least one of radially outward and radially inward, for radial compression with a transition slope on the insertion sleeve (44) in the direction toward the collector (2).

5. Tube connection according to claim 4, wherein the (first) sealing element (48; 48a) is designed in the form of an O-ring.

6. Tube connection according to claim 4, characterized in that the (first) sealing element (48) is designed with a pair of radially inner and radially outer sealing lips (56a, 56b), to which pressure can be applied internally on the collector side, and of which the radially inner sealing lip (56a) has a radial prestress radially inward against the line (16) and the radially outer sealing lip (56b) has a radial prestress radially outward against the connecting sleeve (14).

7. Tube connection according to claim 1, characterized in that the insertion sleeve (44) is provided with an axial succession of at least two (first) sealing elements (48a, b, c).

8. Tube connection according to claim 1, characterized in that at least one second locally circumferential sealing element (52; 52a), which is axially compressible, is formed on one of the sealing flange (46) of the seal (28) and in the transition region of the sealing flange (46) into the insertion sleeve (44).

9. Tube connection according to claim 8, characterized in that the second sealing element (52; 52a) is designed as a projection in one axial direction.

10. Tube connection according to claim 8, characterized by a pair of projections (52; 52a), of which a first one of said pair of projections (52) is arranged positioned opposite the outer bead (36) and a second one of said pair of projections (52a), is arranged opposite the outer flange (38).

11. The tube connection according to claim 10, wherein the second one of said pair of projections is disposed radially further out than said first one of said pair of projections.

12. Tube connection according to claim 1, wherein the insertion sleeve (44) is arranged with radial extensive compression, at least in a transition region between the first sealing element (48) and the sealing flange (46).

13. Tube connection according to claim 12, further including a capillary break (62) located proximate at least one of the extensive compression, and the contact between the outer profile of the insertion sleeve (44) and the inner profile of the connecting sleeve (14).

14. The tube connection according to claim 12, wherein the first sealing element (48) is a single sealing element and is disposed adjacent to the collector.

15. The tube connection according to claim 12, wherein said first sealing element includes a plurality of elements, one of said plurality of sealing elements being disposed furthest from the collector, said transition region being located between the said one of said plurality of sealing elements and the sealing flange (46).

16. Tube connection according to claim 1, wherein an outer profile of a transition of the insertion sleeve (44) into its sealing flange (46) is matched, in a shape of a wedge, to a widening inner profile of a transition of the connecting sleeve (14) into the outer flange (38).

17. The tube connection according to claim 16, further including a capillary break (62) proximate at least one of the extensive compression, and the contact between the outer profile of the insertion sleeve (44) and the inner profile of the connecting sleeve (14).

18. Tube connection according to claim 1, characterized in that a preferably circumferential return projection (66), which engages over the outer edge of the outer flange (38), of the sealing flange (46) is formed in the outer edge region of the sealing flange (46).

19. Method for producing a tube connection according to one of claims 1 to 18, characterized in that the seal (28), with its insertion sleeve (44), is firstly inserted into the free end of the connecting sleeve (14), then the free end of the line (16) is inserted into the insertion sleeve (44), and finally the sealing flange (46) is clamped between the outer flange (38) of the connecting sleeve (14) and the outer bead (36) of the line (16).

20. Method according to claim 19, wherein the insertion of the insertion sleeve (44) of the seal (28) into the connecting sleeve (14) is carried out until the sealing flange (46) is in contact with the outer flange (38), and the insertion of the line (16) into the insertion sleeve (44) of the seal (28) is carried out until the outer bead (36) of the line (16) is in contact with the sealing flange (46).

21. The tube connection according to claim 1, wherein said sealing element functions as an o-ring.

22. The tube connection according to claim 1, wherein the clamping device, is a connection clip (42).

23. The tube connection according to claim 1 wherein the sealing flange (46) is formed on the end of the insertion sleeve (44) remote from the collector.

24. The tube connection according to claim 1, wherein the line (16) has an outer diameter in a range between 15 to 22 mm.

25. The tube connection according to claim 24, wherein the line has a wall thickness of from 0.7 to 2 mm.

26. The tube connection according to claim 1, wherein the line has a wall thickness of from 0.7 to 2 mm.

27. The tube connection according to claim 1, wherein the connecting sleeve (14)—is made of aluminum.

28. The tube connection according to claim 1, wherein the connecting sleeve (14)—is made of an aluminum alloy.

29. The tube connection according to claim 1, wherein the connecting sleeve (14)—is made of aluminum and an aluminum alloy.

* * * * *